United States Patent
Widdowson et al.

(10) Patent No.: US 7,372,891 B1
(45) Date of Patent: May 13, 2008

(54) SIGNAL GENERATOR AND DECODER

(75) Inventors: Terence Widdowson, Ipswich (GB); Jonathan Go Moss, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 910 days.

(21) Appl. No.: 10/031,231

(22) PCT Filed: Aug. 3, 2000

(86) PCT No.: PCT/GB00/02997

§ 371 (c)(1),
(2), (4) Date: Jan. 17, 2002

(87) PCT Pub. No.: WO01/13531

PCT Pub. Date: Feb. 22, 2001

(30) Foreign Application Priority Data

Aug. 17, 1999 (EP) ................................. 99306490

(51) Int. Cl.
*H04B 1/69* (2006.01)
*H04B 1/713* (2006.01)

(52) U.S. Cl. ................. 375/146; 375/135; 375/301

(58) Field of Classification Search ............ 375/146, 375/219, 295, 140, 141, 299, 224, 270, 135, 375/145, 301, 309, 256, 257, 130, 341, 220, 375/143; 455/46; 342/380; 370/209, 332, 370/334, 335
See application file for complete search history.

(56) References Cited

U.S. PATENT DOCUMENTS

| | | | |
|---|---|---|---|
| 4,726,069 A * | 2/1988 | Stevenson ................. 455/46 |
| 5,422,909 A | 6/1995 | Love et al. | |
| 5,434,577 A * | 7/1995 | Baghdady ................. 342/380 |
| 5,631,898 A * | 5/1997 | Dent ........................ 370/203 |
| 5,675,608 A | 10/1997 | Kim et al. | |
| 5,838,719 A | 11/1998 | Moore, III | |
| 5,937,006 A * | 8/1999 | Clark et al. ................ 375/224 |
| 5,999,300 A * | 12/1999 | Davies et al. ............. 398/185 |
| 6,005,894 A * | 12/1999 | Kumar ..................... 375/270 |
| 6,148,021 A * | 11/2000 | Moore, III ................ 375/141 |
| 6,288,610 B1 * | 9/2001 | Miyashita .................. 330/149 |
| 6,351,500 B2 * | 2/2002 | Kumar ..................... 375/270 |
| 6,377,539 B1 * | 4/2002 | Kang et al. ................ 370/209 |
| 6,377,631 B1 * | 4/2002 | Raleigh ..................... 375/299 |
| 6,389,000 B1 * | 5/2002 | Jou ............................ 370/342 |
| 6,430,213 B1 * | 8/2002 | Dafesh ...................... 375/146 |
| 6,490,267 B1 * | 12/2002 | Kim et al. .................. 370/342 |
| 6,798,843 B1 * | 9/2004 | Wright et al. .............. 375/296 |

OTHER PUBLICATIONS

Gordon B. Lockhart "A Spectral Theory for Hybrid Modulation", IEEE, Transaction on Communications, vol. COM-21, No. 7, Jul. 1973.*

(Continued)

*Primary Examiner*—Chieh M. Fan
*Assistant Examiner*—Qutub Ghulamali
(74) *Attorney, Agent, or Firm*—Nixon & Vanderhye P.C.

(57) ABSTRACT

A signal generator and decoder are used for a single sideband spread spectrum signal. A single sideband spread spectrum signal generator and decoder in which single sideband modulation using a complex spreading code is achieved with improved correlation properties, so that the interference between users is reduced.

4 Claims, 14 Drawing Sheets

OTHER PUBLICATIONS

Bingham, John A.C., "Multicarrier Modulation for data Transmission: An Idea whose Time Has Come", 19990, IEEE Communications Magazine.*

Lotter et al, A Class of Bandlimited Complex Spreading Sequences with Analytic Properties, 1996 IEEE , pp. 662-666.

Sarwate et al, "Crosscorrelation Properties of Pseudorandom and Related Sequences", 1980 IEEE, pp. 593-619.

Sarwate, "Bounds on Crosscorrelation and Autocorrelation of Sequences", 1979 IEEE, pp. 720-725.

Popovic, "Generalized Chirp-Like Polyphase Sequences with Optimum Correlation Properties", 1992 IEEE, pp. 1406-1409.

Marx et al, "Theoretical Analysis and Practical Implementation of a Balanced DSSS Transmitter and Receiver Employing Complex Spreading Sequences", pp. 402-407.

Lotter et al, "DSSS System Employing a Class of Modulatable Complex Spreading Sequences", The Transactions of the S.A. Institute of Electrical Engineers, Mar. 1996, pp. 1-7.

Lotter et al, "A Class of Bandlimited Complex Spreading Sequences with Analytic Properties", 1996 IEEE , pp. 662-666.

Frank et al, "Polyphase Codes with Good Nonperiodic Correlation Properties", IEEE Transactions on Information Theory, 1963, pp. 43-44.

Chu, "Polyphase Codes with Good Periodic Correlation Properties", pp. 531-532, Jan. 1972.

Marx et al, "Theoretical Analysis and Practical Implementation of a Balanced DSSS Transmitter and Receiver Employing Complex Spreading Sequences", pp. 402-407, IEEE, Africon, vol. 1., Sep. 1996.

* cited by examiner

Fig.4a.
Autocorrelation function

Fig.4b.
Crosscorrelation function

Fig.5a.

Filtered FZC Sequence (Seq 1 of length 63) - REAL

Filtered FZC Sequence (Seq 1 of length 63) - IMAGINARY

Fig.5b.

Hilbert T-form of Filtered FZC Sequence (Seq 1 of length 63) - REAL

Hilbert T-form of Filtered FZC Sequence (Seq 1 of length 63) - IMAGINARY

Performance of DSB, overlay and SSB

SIGNAL GENERATOR AND DECODER

BACKGROUND

1. Technical Field

This invention relates to a signal generator for providing a single sideband (SSB) spread spectrum signal.

2. Related Art

Currently all cellular networks use double sideband modulation to upconvert a baseband signal to a radio frequency. Hence, the same information is conveyed in both sidebands, and the signal uses twice the bandwidth than is absolutely necessary. Single sideband modulation allows the same amount of information to be transmitted using half the bandwidth of double sideband modulation, or alternatively twice the amount of information in the same bandwidth.

The next generation of cellular networks is known as Universal Mobile Telecommunications Systems (UMTS). Wideband code division multiple access (W-CDMA) will be used for 60 MHz of paired spectrum, i.e. two separate bands of 60 MHz, the lower band being used for the uplink and the higher band being used for the downlink. The use of W-CDMA facilitates high bit rates for mobile users.

The capacity of a code division multiple access (CDMA) system is determined by the number of chips per symbol (known as the processing gain) divided by the energy per bit divided by noise power spectral density (Eb/No). If the number of chips per symbol can be increased then the capacity is increased. The maximum chipping rate is limited by the available bandwidth. Single sideband modulation reduces the bandwidth required by a modulated signal by a half. Therefore if a single sideband modulated signal can be produced then either the chipping rate can be increased, or two single sideband signals (upper and lower sideband) may be employed in order to increase the capacity of a CDMA system.

However, traditional techniques used to produce a single sideband signal, such as bandpass filtering or the well known phasing method cannot be used with data where the spectrum extends down to DC.

Figure 1:
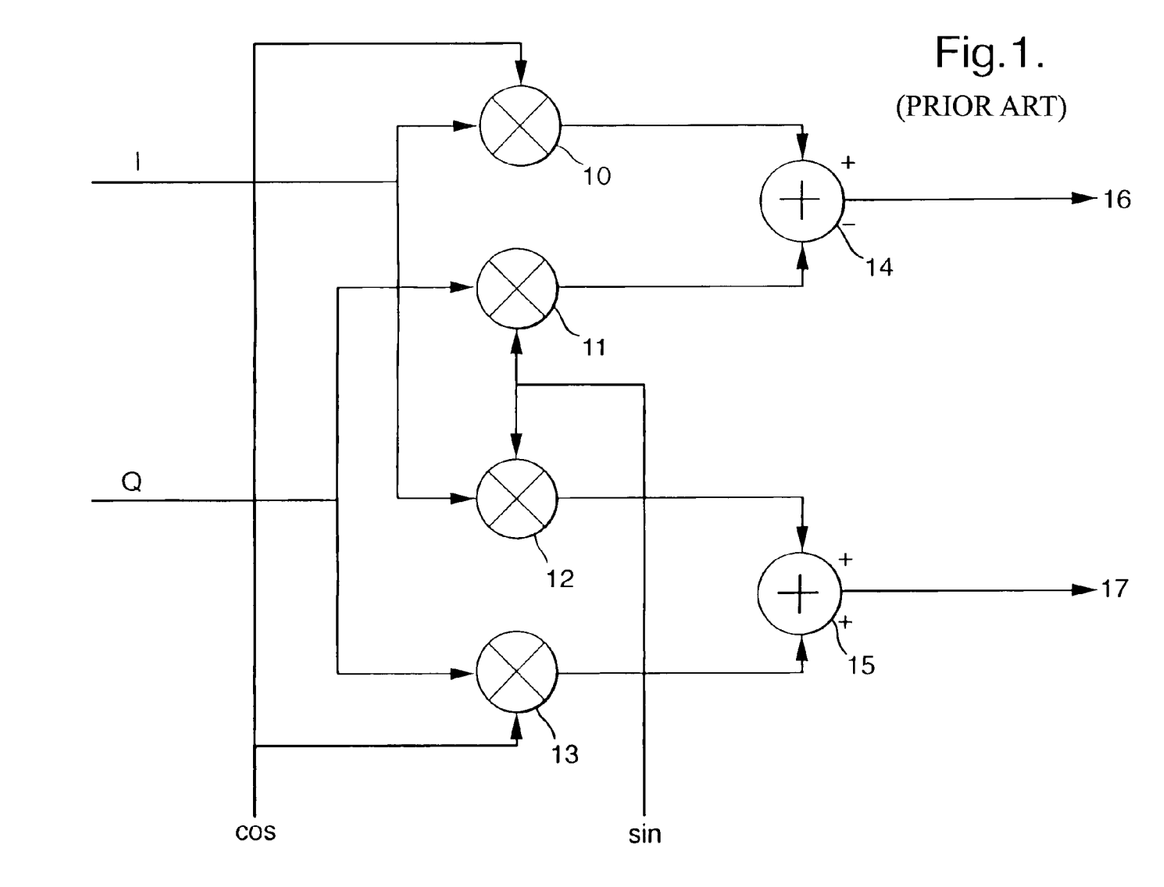
FIG. 1 shows a known modulator for producing a single sideband transmission signal from an arbitrary information source.

A known method of producing a single sideband signal is shown in FIG. 1. However this complex modulator may not be used with traditional spreading codes such as PN code, Walsh codes, Gold code etc. to produce SSB because these codes are binary and do not provide a suitable complex spread spectrum signal. The autocorrelation and cross correlation properties of these signals are good. However, if the signal is transformed (eg. by the Hilbert transform) to produce a quadrature signal, then discontinuities and poor correlation properties result. Poor correlation properties result in an increase in the interference experienced by other users and thus decrease the capacity of the system. Hence, to use a modulator such as that shown in FIG. 1 a spreading code is required which has good correlation properties in both the real and imaginary domains if a corresponding increase in capacity is to be achieved.

Complex spreading codes with the desired properties are known, for example Frank-Zadoff-Chu (FZC) codes as described in "Polyphase codes with good non-periodic correlation properties", R. L. Frank, IEEE Transactions of Information Theory, vol. IT-9, pp. 43-45, Jan. 1963. However, use of these codes produces a spread spectrum signal which is not bandlimited as will be shown later, so that whatever modulation is used the resulting signal would occupy limitless bandwidth. In "A class of bandlimited complex spreading sequences with analytic properties", M. P. Lotter and L. P. Linde, Proc of ISSSTA 95, 22-25 Sep. 1996, it was shown that by limiting the phase shift between successive samples of the sequence to be less than $\pi$ radians, a bandlimited signal may be obtained and a set of codes called analytic bandlimited complex sequences derived. The penalty paid for this filtering process is that both the autocorrelation and crosscorrelation functions of the codes are no longer ideal so the number of users which may be supported is reduced. So, although the number of chips per symbol is increased in this known system, the resulting poor correlation properties do not result in a corresponding increase in capacity.

BRIEF SUMMARY

The present invention seeks to alleviate these problems by providing a single sideband spread spectrum signal generator in which single sideband modulation using a complex spreading code is achieved with improved correlation properties, so that the interference between users is reduced.

According to the present invention there is provided a method of generating a single sideband spread spectrum signal comprising the steps of:

phase-shifting a complex spreading signal in accordance with a Hilbert transform to produce a phase-shifted complex spreading signal;

upconverting the complex spreading signal and the phase-shifted complex spreading signal to a higher frequency to produce the single sideband spread spectrum signal, bandlimiting one of at least the complex spreading signal or the single sideband spread spectrum signal; and modulating one of the complex spreading signal or the single sideband spread spectrum signal with a received signal, wherein the order in which the steps are performed is immaterial provided that the phase shifting step is performed before the upconversion step.

In a preferred embodiment of the invention the upconverting step comprises the substeps of modulating a signal of the upconverted complex signal in accordance with the real part of the complex signal combined with the imaginary part of the phase shifted complex signal; and modulating a quadrature signal of the upconverted complex signal in accordance with the imaginary part of the complex signal combined with the real part of the phase shifted complex signal.

Preferably the complex spreading signal is derived from a sequence defined by the equation $$\alpha_m = W_N^{m^2/2+qm} \quad N \text{ even}$$
$$= W_N^{m(m+1)/2+qm} \quad N \text{ odd}$$

where $W_N = e^{-i2\pi r/N}$ $m = 0, 1, 2, \ldots, N-1$, q is any integer and the number of sequences of a given length is The bandlimiting step may be performed prior to the phase shifting step or the bandlimiting step may be performed after the upconversion step.

In some embodiments of the invention the modulation step is performed after the upconversion step.

According to a second aspect of the invention there is provided an apparatus for transmitting a single sideband spread spectrum signal, comprising: a complex spreading signal generator (1) for generating a complex spreading signal:
  a phase shifter (3) coupled to receive the complex spreading signal via the complex spreading signal generator and for phase-shifting the complex spreading signal in accordance with a Hilbert Transform to provide a phase-shifted complex-spreading signal;
  a complex modulator (6) coupled to receive the complex spreading signal and the phase-shifted complex spreading signal for upconversion thereof to produce the single sideband spread spectrum signal;
  a bandlimiting filter (2, 2', 2"; 8) for bandlimiting one of at least the Complex spreading signal or the single sideband spread spectrum signal; and
  a data modulator (4, 5; 9) connected to receive an input signal for modulating one of the complex spreading signal or the single sideband spread spectrum with the input signal.

In some embodiments of the invention the bandlimiting filter is a low pass filter connected to receive the output of the complex spreading signal generator. In other embodiments of the invention the bandlimiting filter is a band pass filter connected to receive the output of the complex modulator.

In some embodiments of the invention the data modulator is coupled to receive a second signal via the complex modulator.

According to another aspect of the invention there is provided a method of decoding a single sideband signal comprising the steps of phase shifting a complex spreading signal in accordance with a Hilbert Transform; upconverting the complex spreading signal to a higher frequency; and demodulating a received signal in accordance with the upconverted complex spreading signal.

Preferably the complex spreading signal is derived from a sequence defined by the equation $W_N = e^{-i2\pi r/N}$ $$\alpha_m = W_N^{m^2/2+qm} \quad N \text{ even}$$
$$= W_N^{m(m+1)/2+qm} \quad N \text{ odd}$$

where 0, 1, 2, . . . , N–1, q is any integer and the number of sequences of a given length being N.

According to another aspect of the invention there is provided an apparatus for decoding a transmitted signal, comprising: a complex spreading signal generator; a phase shifter connected to receive the complex spreading signal from the complex spreading signal generator; a complex modulator connected to receive the complex spreading signal from the complex spreading signal generator, connected to receive the phase shifted complex spreading signal from the phase shifter and arranged in operation to upconvert the complex spreading signal; and a data modulator connected to receive the transmitted signal and the upconverted complex spreading signal and arranged in operation to demodulate the transmitted signal to provide a decoded transmitted signal.

BRIEF DESCRIPTION OF THE DRAWINGS

Methods of and apparatus for generating and decoding signals according to the present invention will now be described, by way of example only, with reference to the accompanying drawings in which.

FIG. 1 shows a known modulator for producing a SSB. A data signal I and its corresponding quadrature signal Q are modulated at modulators 10 and 13 by a cosine wave of the modulation frequency. The data signals I and Q are also modulated at modulators 12 and 11 by a sine wave of the modulation frequency. The outputs of the modulators 10 and 11 are fed to an adder 14 providing an SSB signal 16 and the outputs of the modulators 12 and 13 are fed to an adder 15 to provide an SSB output signal 17. The output at 16 is 90 degrees out of phase with the output at 17. The modulator of FIG. 1 provides an upper sideband signal, a lower sideband signal may be produced by changing the sign of one of the inputs to the adders 14 and 15. It will be appreciated that a modulator which simply produces one or the other of the output signals 16 or 17 could equally well be used.

Figure 2:
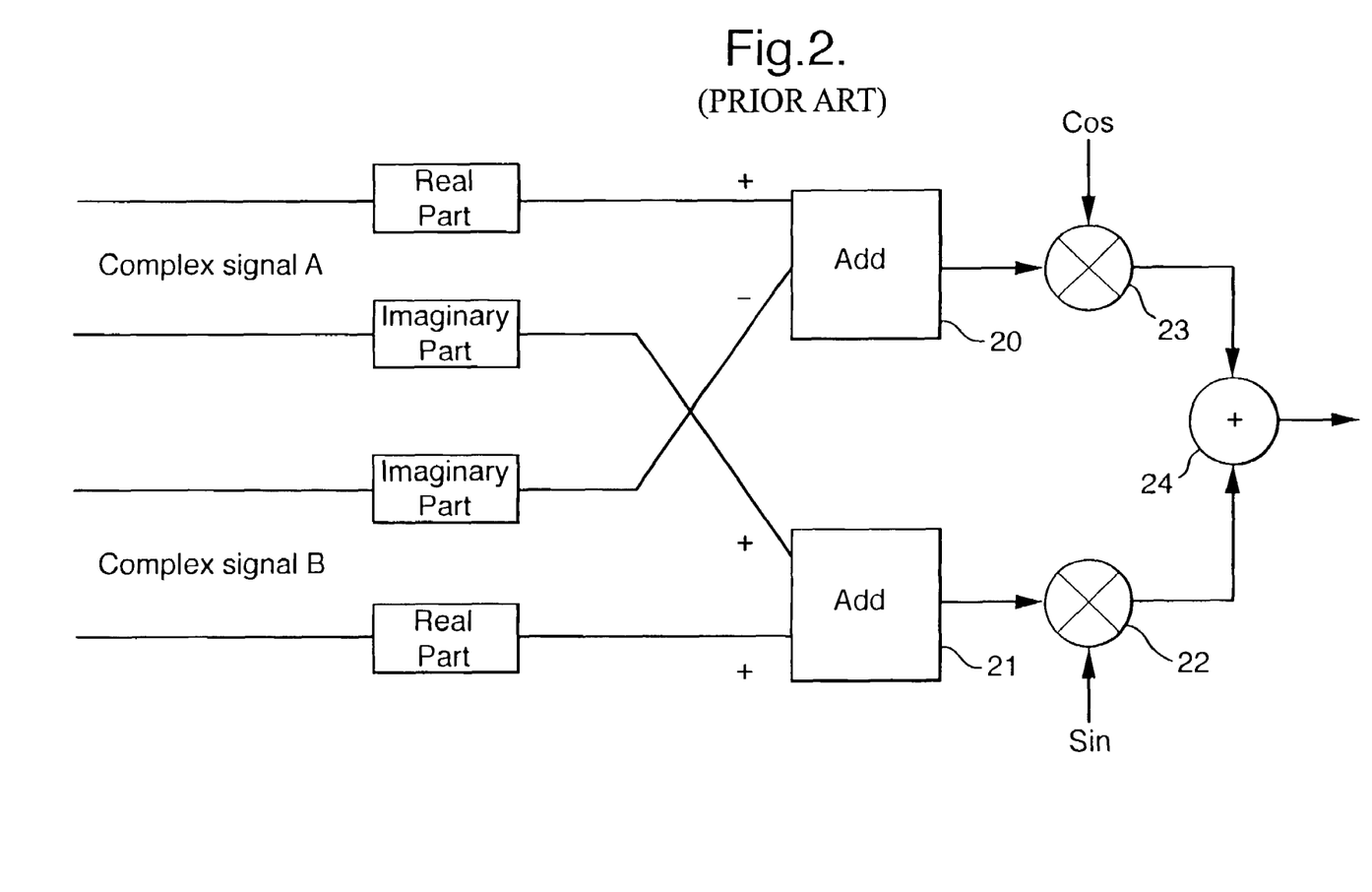
FIG. 2 shows a known complex modulator for producing a single sideband transmission signal from complex input data.

FIG. 2 shows a complex modulator for producing a SSB signal from a complex input signal. Complex signal B is the quadrature counterpart of complex signal A. The imaginary part of complex signal B is subtracted from the real part of complex signal A (via an inverter, not shown) at an adder 20, and the resultant summed signal is then modulated by a cosine wave of the modulation frequency at a modulator 23. Similarly, the imaginary part of complex signal A is added to the real part of complex signal B at an adder 21, and the summed signal is then modulated by a sine wave of the modulation frequency at modulator 22. The two modulated signals are summed at an adder 24 to produce an SSB signal. The complex modulator of FIG. 2 produces an upper sideband signal, a lower sideband signal may be produced by changing the sign of one of the inputs to the adders 20 and 21.

Figure 3A:
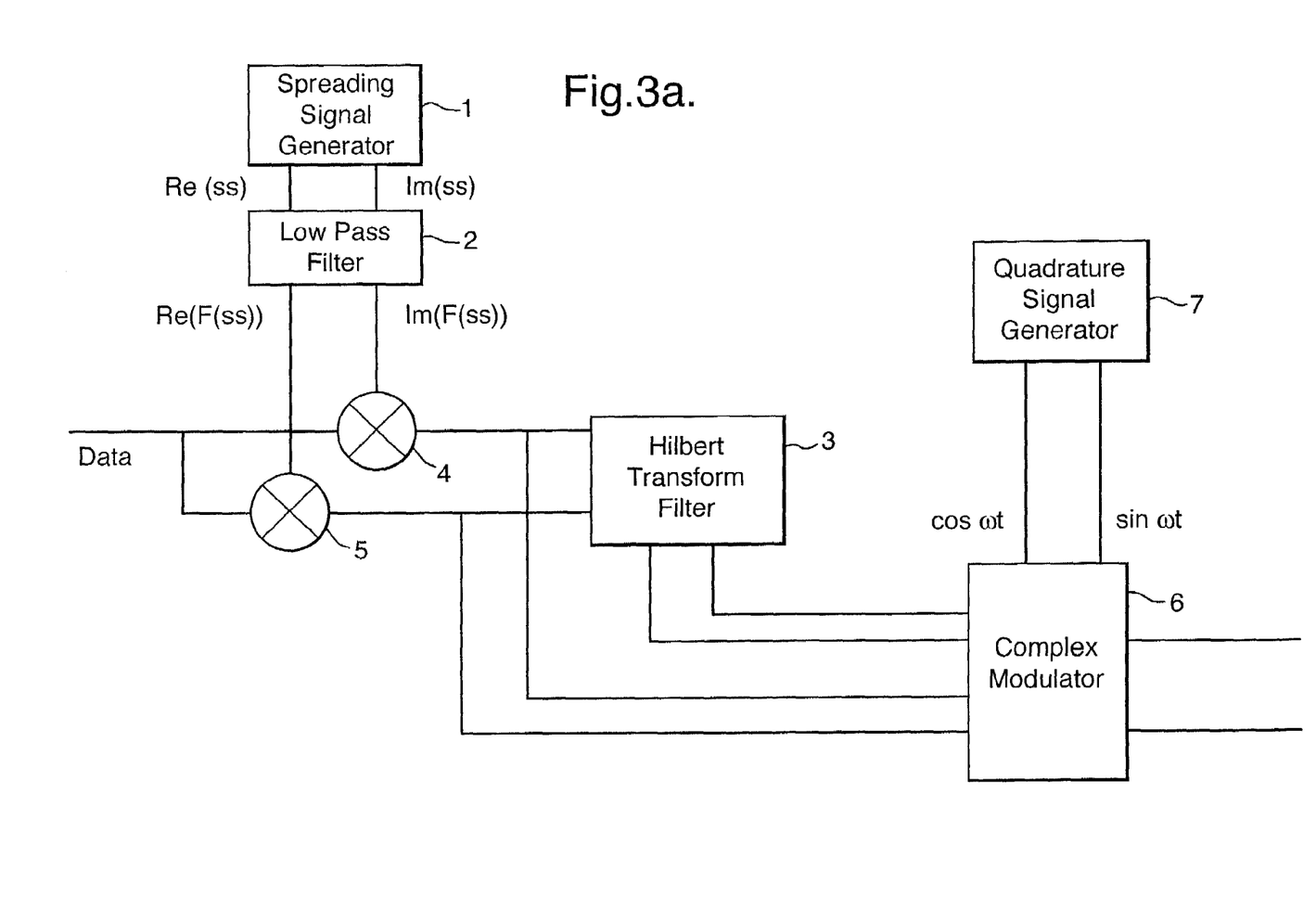
FIGS. 3a to 3e show embodiments of a signal generator according to the invention.

FIG. 3a shows a first embodiment of an SSB spread spectrum signal generator according to the invention comprising a complex spreading signal generator 1 which generates a complex spreading signal, denoted Re(ss) and Im(ss). The nature of the complex spreading signal will be described later with reference to FIG. 5. The complex spreading signal is received by a low pass filter 2 which outputs a filtered complex spreading signal, the real part of which is denoted Re(F(ss)) and the imaginary part of which is denoted Im(F(ss)). The filter 2 is implemented as a root raised cosine filter, although any type of low pass filter could be used. A data signal modulates the real and imaginary complex spreading signals at modulators 4 and 5 to produce a modulated complex signal. The modulated complex signal is then phase shifted by 90 degrees using a Hilbert Transform filter 3 to produce the quadrature counterpart of the complex signal. These complex signals are then upconverted to the desired frequency by a complex modulator 6 to provide as an output an SSB spread signal. Cosine and sine waves of the desired frequency are provided by a signal generator 7.

Figure 3B:
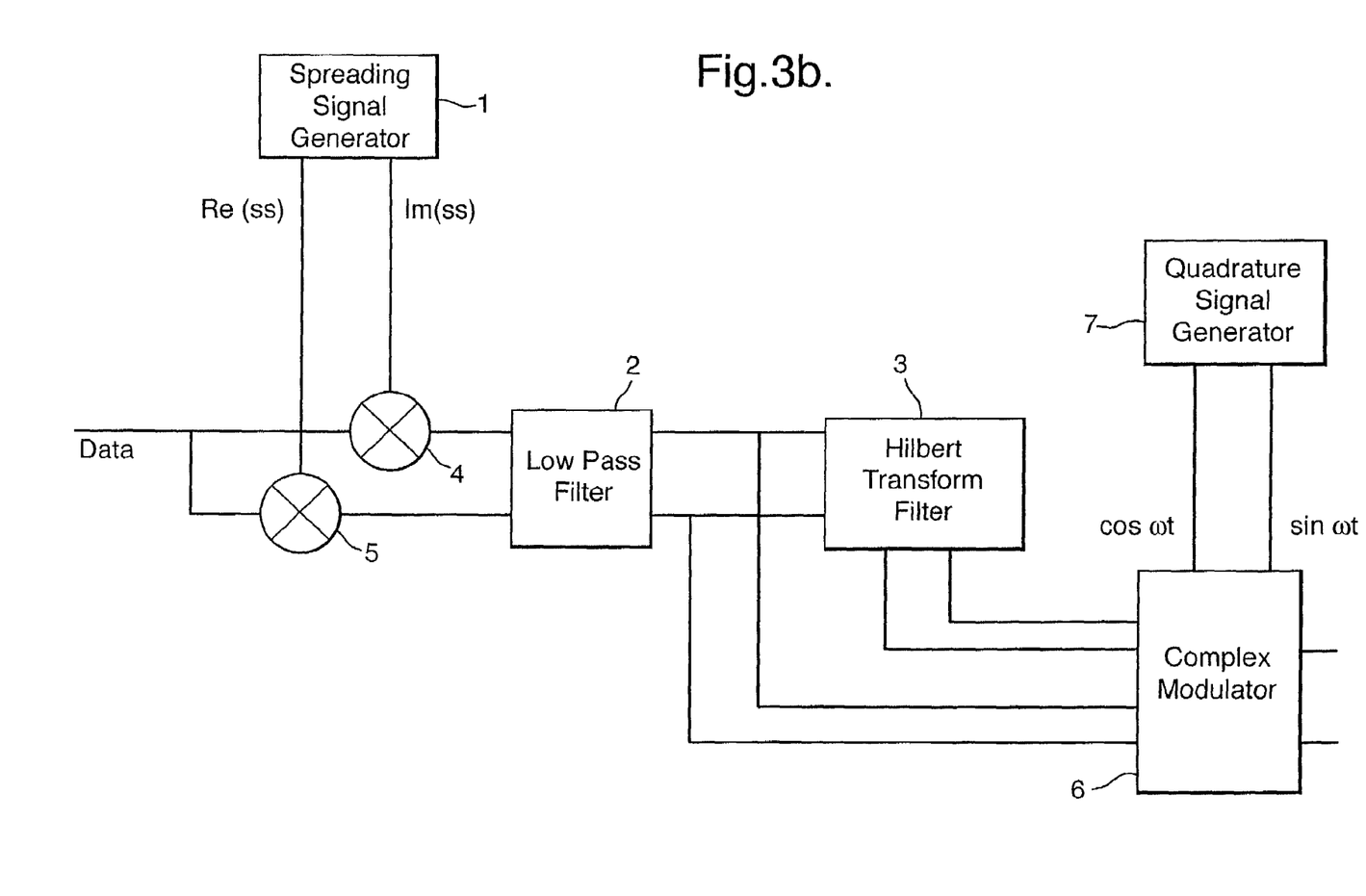
Figure 3C:
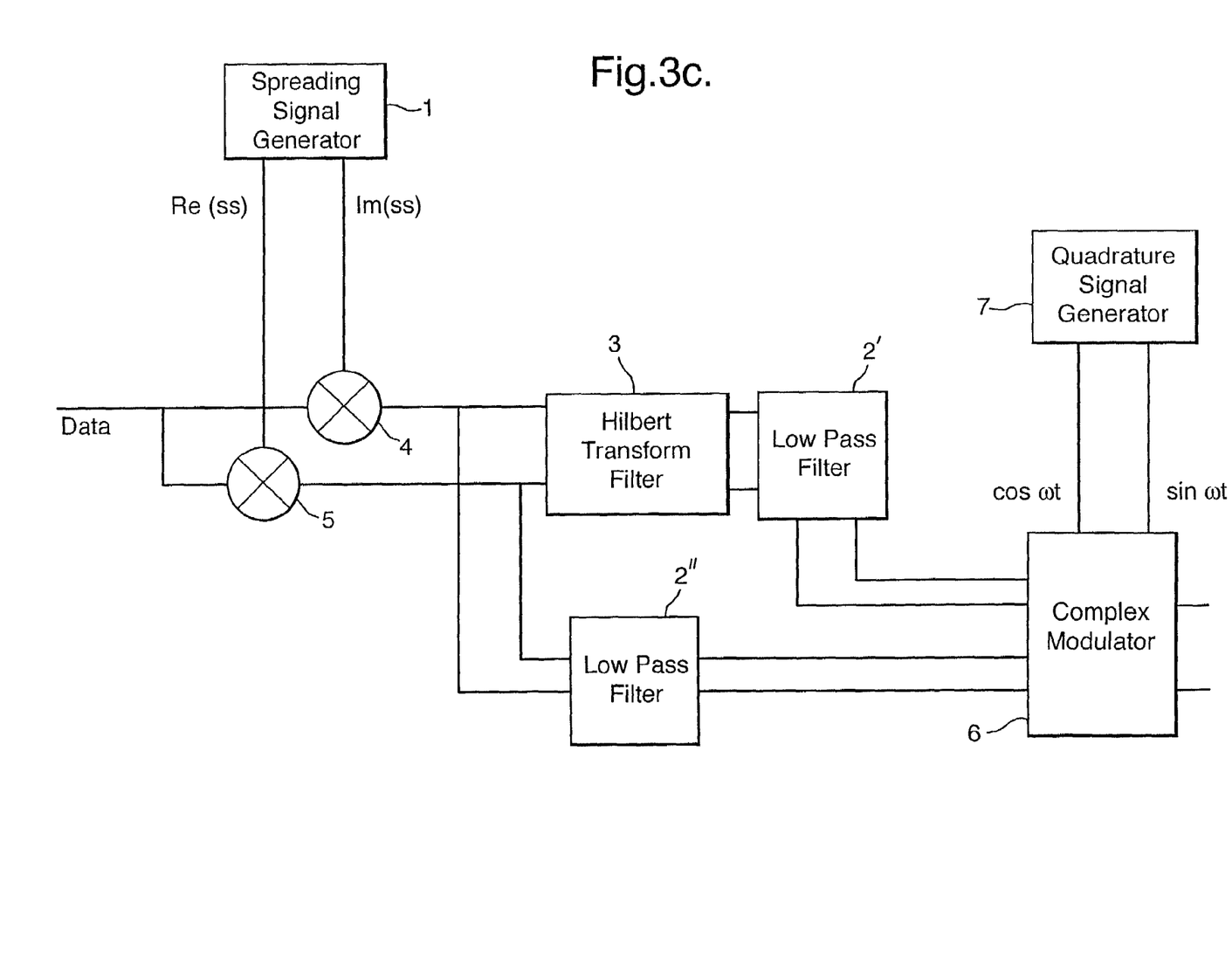
Figure 3D:
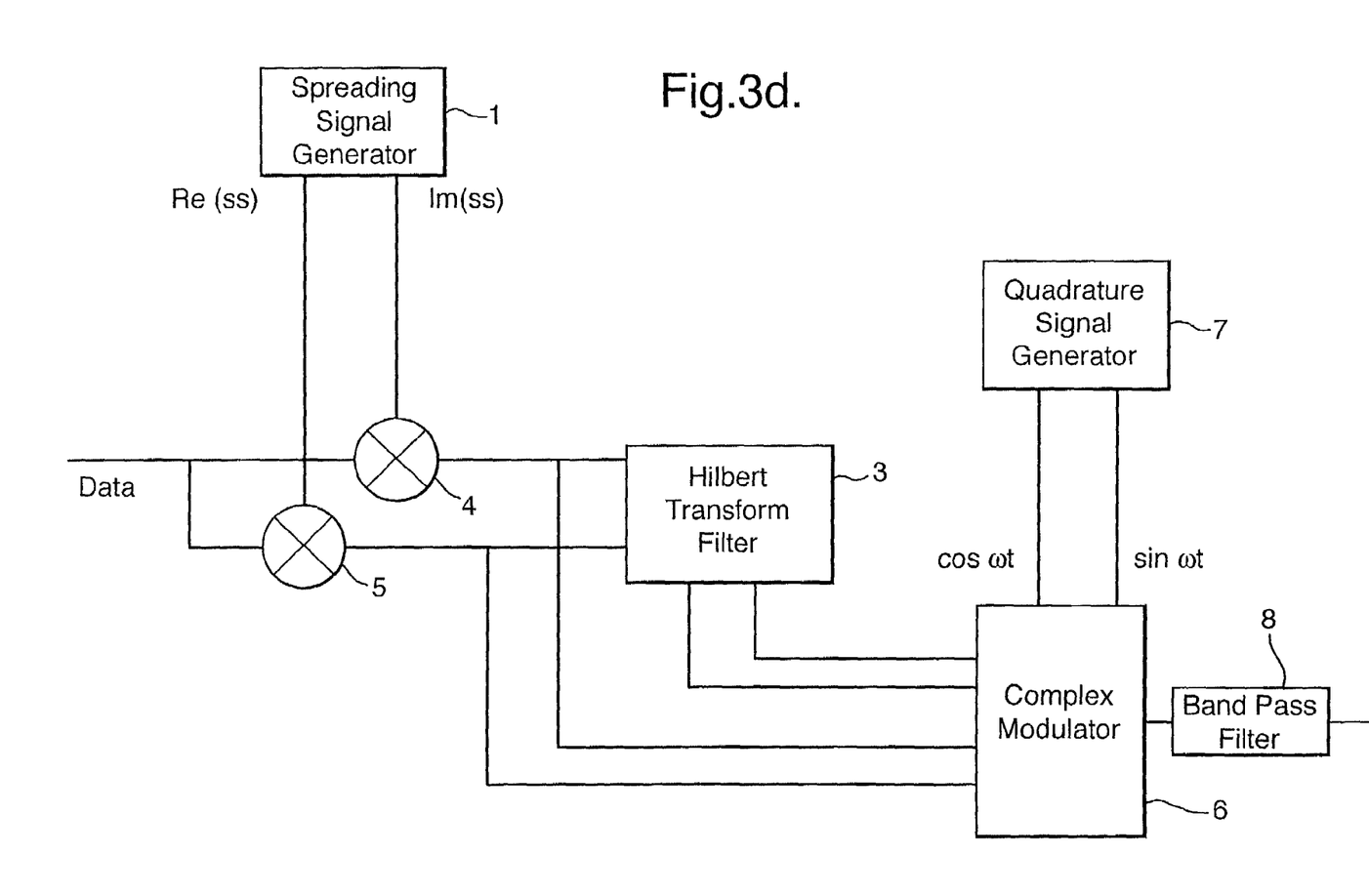

FIG. 3b shows an embodiment of the invention in which the complex signal is filtered after modulation by the input data. Equally filtering can be performed after the Hilbert transform, as shown in the embodiment of FIG. 3c. This embodiment requires the use of two low pass filters 2' and 2". FIG. 3d shows an embodiment of the invention in which the upconverted SSB signal is bandlimited by a band pass filter 8.

Figure 3E:
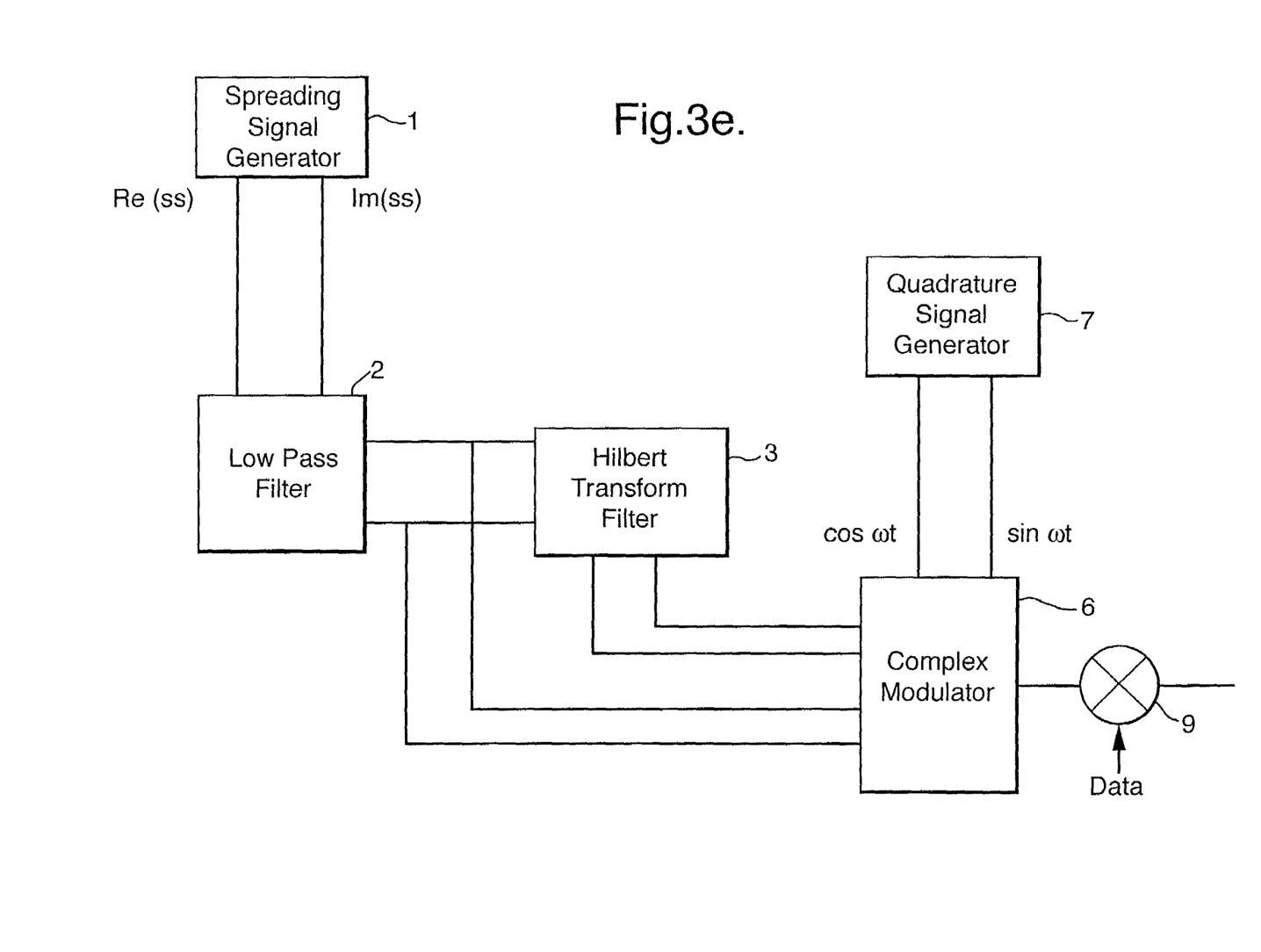

FIG. 3e shows an embodiment of the invention in which the data modulates the upconverted SSB signal at a modulator 9. It will be appreciated that bandlimiting of the signal can be performed in several ways in a similar manner to the embodiments shown in FIGS. 3b, 3c and 3d.

Figure 4A:
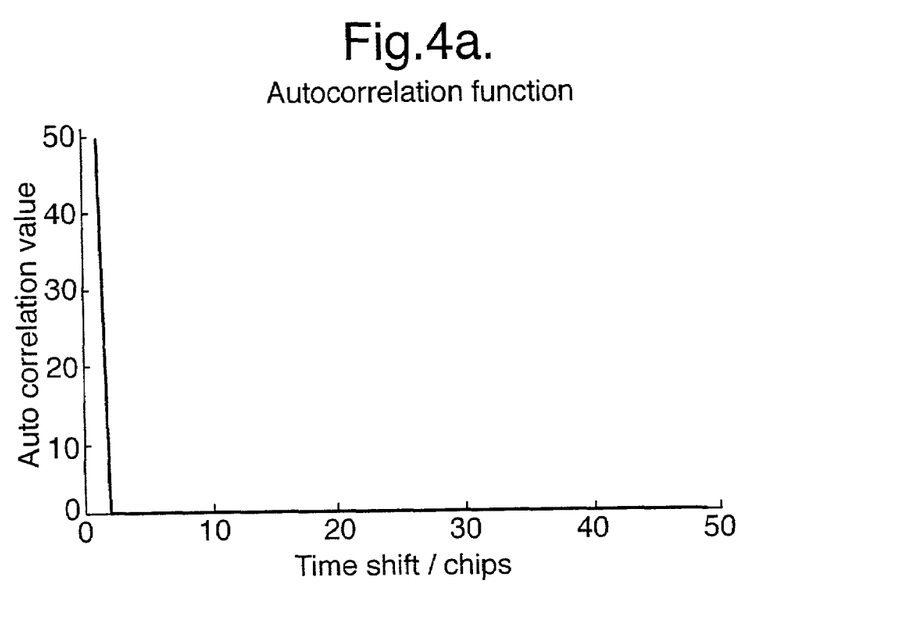
FIG. 4 shows ideal autocorrelation and cross correlation functions for a spreading signal of length 49 chips.
Figure 4B:
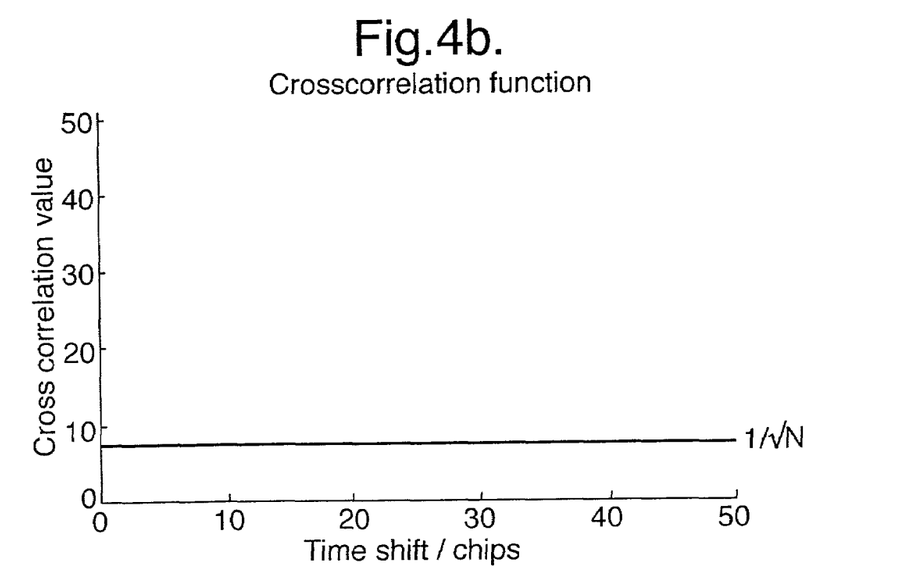

For spread spectrum communications a set of spreading signals is required each of which has an autocorrelation function which is near zero everywhere except at a single maximum per period, and which also has minimum cross correlation functions. It has been shown by D. V. Sarwate in "Bounds on crosscorrelation and autocorrelation of sequences", IEEE Transactions on Information Theory, vol IT-25, pp 720-724, that the maximum magnitude of the periodic cross correlation function and the maximum magnitude of the periodic autocorrelation are related, and that if a set of signals has good autocorrelation properties then the cross correlation properties are not very good, and vice versa. FIGS. 4a and 4b show perfect autocorrelation and ideal cross correlation functions (for a spreading signal of length 49 chips)

The complex spreading signal generator 1 generates one of a family of complex spreading signals which have good correlation properties. The codes used in this embodiment of the invention are known as Frank-Zadoff-Chu (FZC) sequences or codes. They are based on the complex roots of unity:

$$W_N = e^{-i2\pi r/N}$$

Where $i=\sqrt{-1}$, N denotes the FZC sequence length and r is an integer relatively prime to N. The FZC sequences are then defined as:

$$\alpha_m = W_N^{m^2/2+qm} \quad N \text{ even}$$
$$= W_N^{m(m+1)/2+qm} \quad N \text{ odd}$$

where m=0, 1, 2, . . . , N−1 and q is any integer and the number of sequences of a given length is N.

The maximum instantaneous frequency reached by the sequence $\{a_m\}$ is when m=N−1, and can be written as:

$$\omega_{amax} = 2\pi r\left(1 - \frac{1}{N}\right)$$

$$\omega_{a\,max} \approx 2\pi r$$

for large N

Figure 5A:
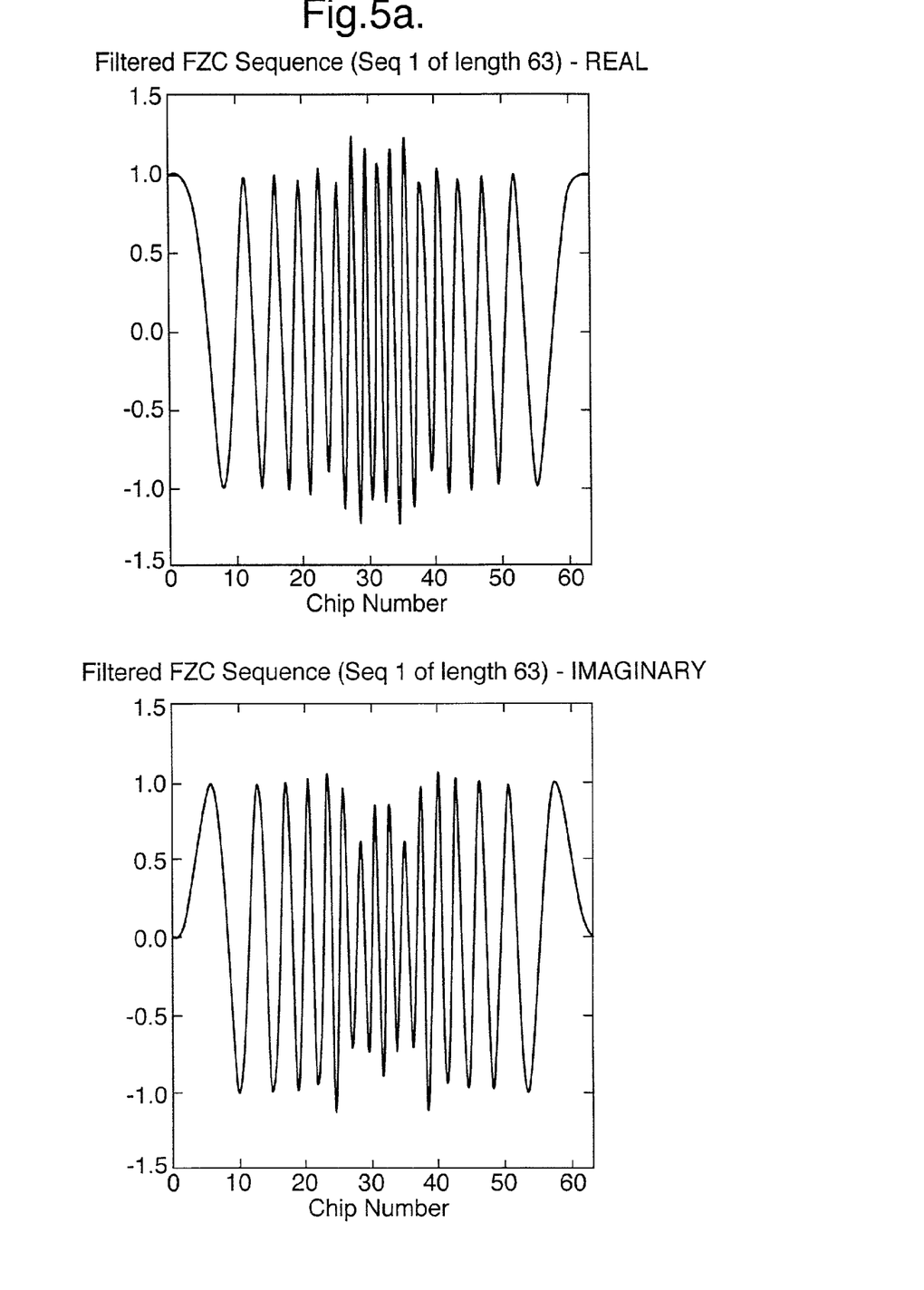
FIG. 5 shows complex spreading signals for use in a signal generator according to the invention.
Figure 5B:
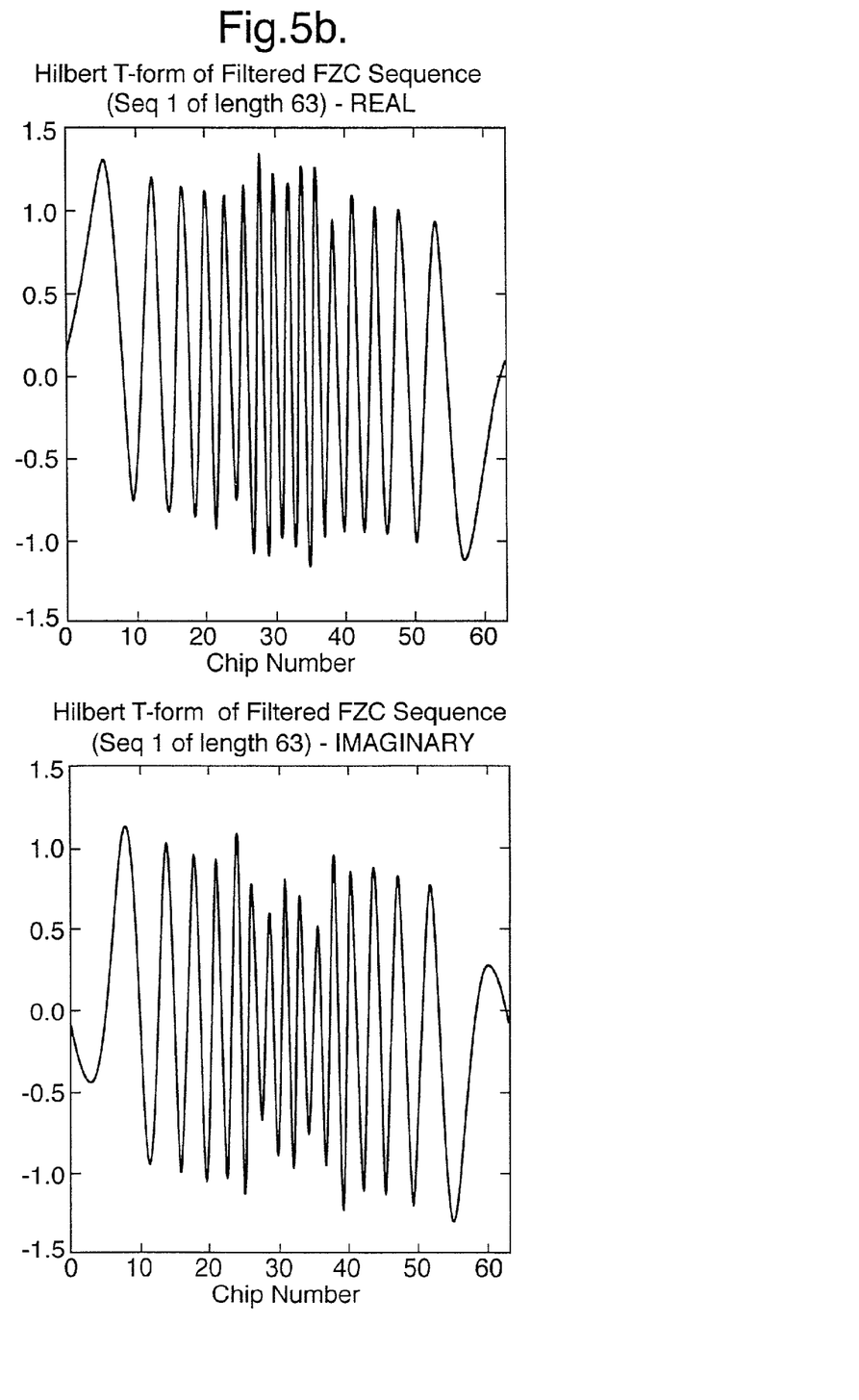

Clearly the maximum instantaneous frequency is not bandlimited to the Nyquist value for the chipping rate and depends upon r. The real and imaginary parts of an FZC sequence are shown in FIG. 5a. The sequence generated by the complex spreading sequence generator 1 is phase shifted by the Hilbert Transform filter 3 to produce a signal which has been phase shifted by 90 degrees. The phase shifted sequence corresponding to the complex sequence of FIG. 5a is shown in FIG. 5b. The complex spreading sequence and the transformed sequence each have good autocorrelation and good cross correlation properties.

The operations of bandlimiting, applying the Hilbert transform, and upconversion to a broadcast frequency using a complex modulator may be performed in any order, as long as the Hilbert Transform is applied before the upconversion step. Hence, in alternative embodiments of the invention the order in which the signals are filtered, spread and modulated is different. For example, referring again to FIG. 3, the complex spreading signal from the spreading signal generator 1 may be phase shifted by the Hilbert transform filter 3 and then the complex spreading signal and the phase shifted spreading signal may each be filtered, although in this case two low pass filters would be required. FIG. 3e shows another alternative embodiment of the invention in which the data is used to modulate the upconverted spread spectrum signal.

Figure 6:
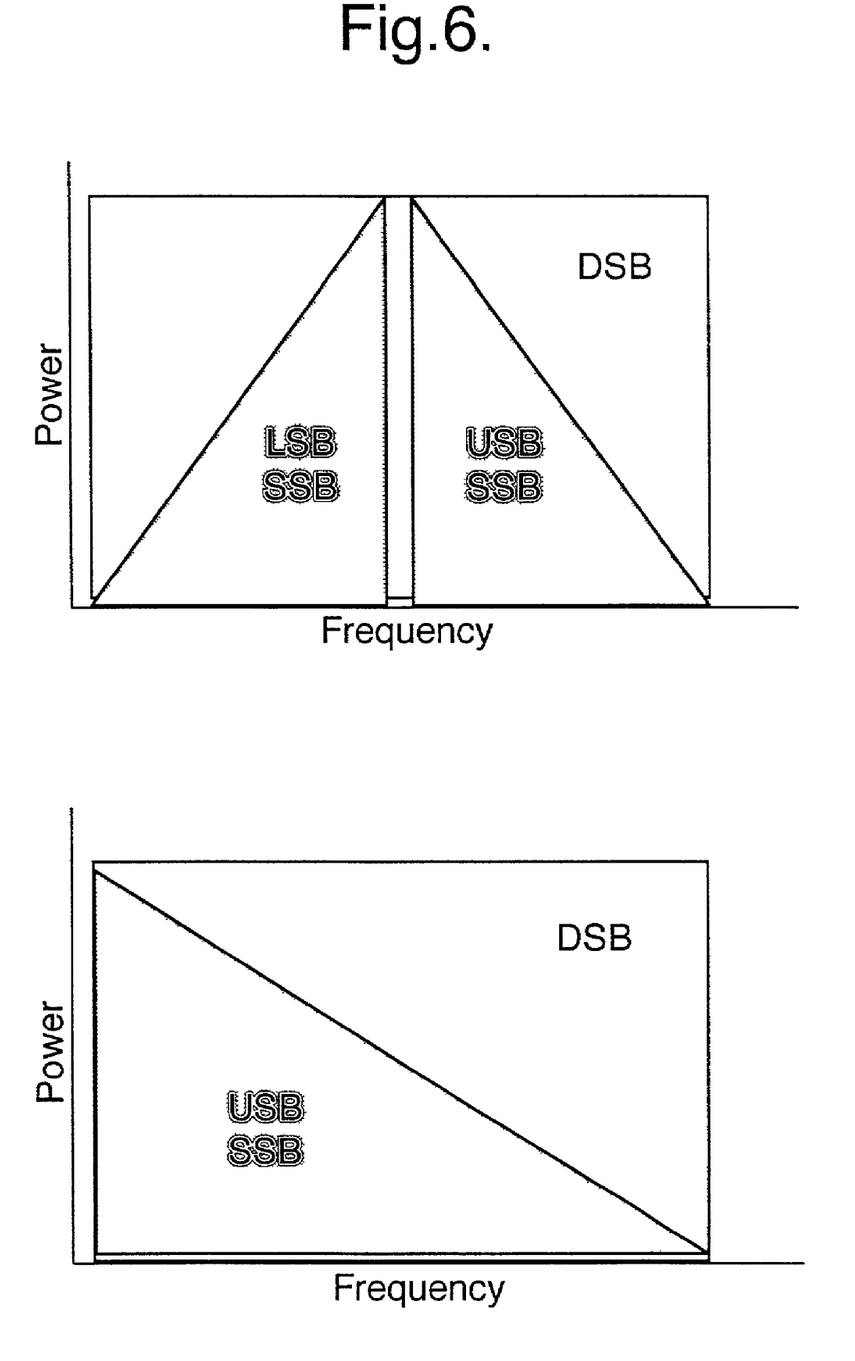
FIG. 6 shows schematically how a signal generator according to the invention may be employed in different ways to increase capacity in a system.
Figure 7:
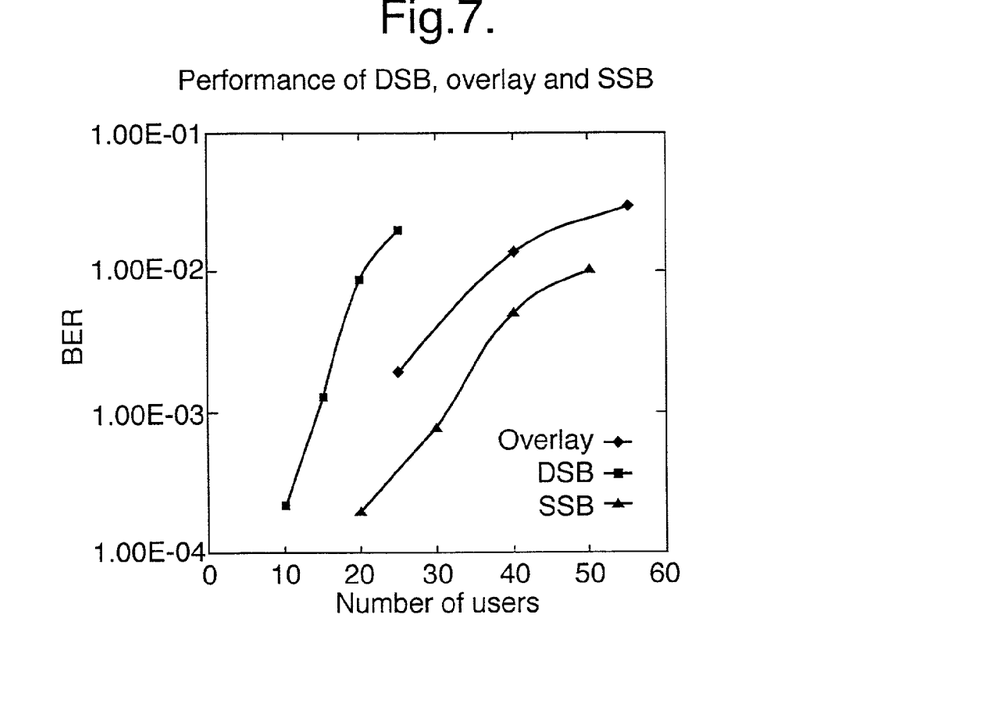
FIG. 7 is a graph showing bit error rate (BER) against the number of users for a system using a signal generator according to the invention, BER for a standard UMTS system using double sideband modulation and BER for a system employing a combination of the techniques which would represent the evolutionary route in the adoption of the invention where SSB and DSB systems co-exist in the same spectrum.

The capacity of the system is potentially increased because either two SSB signals may be used in a single existing UMTS channel or one SSB channel of twice the chipping rate may be employed, as shown schematically in FIG. 6. For a practical system which allows a smooth transition from a standard using double sideband modulation to a standard using SSB modulation, it is desirable that a signal employing SSB modulation and a signal employing double sideband modulation should cause minimal interference to each other. FIG. 7 shows the results of an experiment to measure the BER against the number of users for a system using SSB modulation according to the preferred embodiment of the invention, the BER for a standard UMTS system using double sideband modulation and the BER for a system employing a combination of the techniques, referred to as an 'overlay' in FIG. 7.

Figure 8:
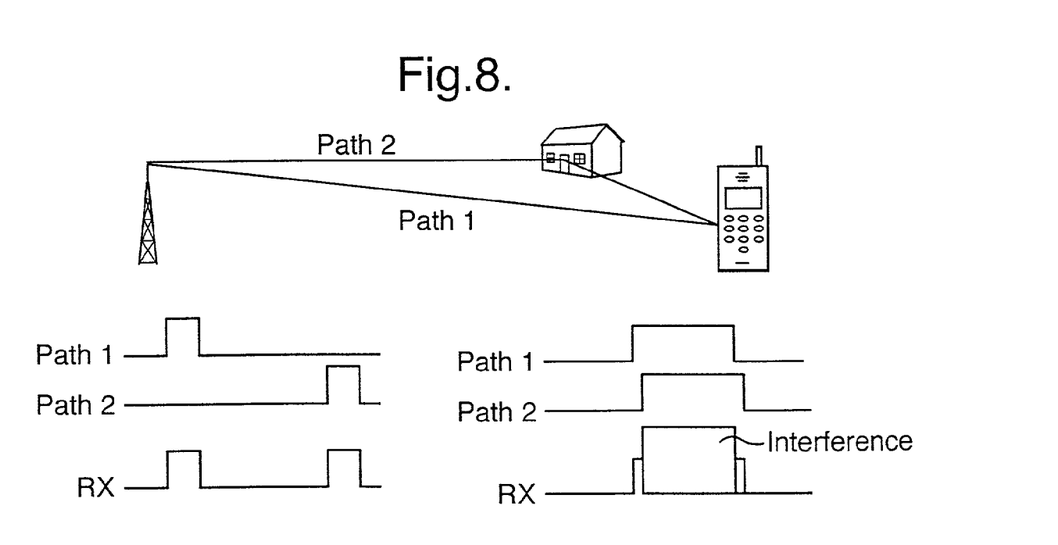
FIG. 8 illustrates how a higher chipping rate can reduce fading (destructive interference) due to multipath propagation.

An advantage of using an SSB channel of twice the chipping rate is that multipath resolution is improved. Multipath resolution is required when a signal may take a plurality of paths between a transmitter and a receiver. If the multipath resolution is improved, the potential increase in capacity is more than 100%, due to reduced fading and hence decreased interference. FIG. 8 illustrates how a higher chipping rate can reduce interference, if it is possible to resolve signals received via different paths. It is also possible to constructively combine signals received via different paths so that the performance of a line with multipaths may actually be improved over that of a perfect channel.

Figure 9:
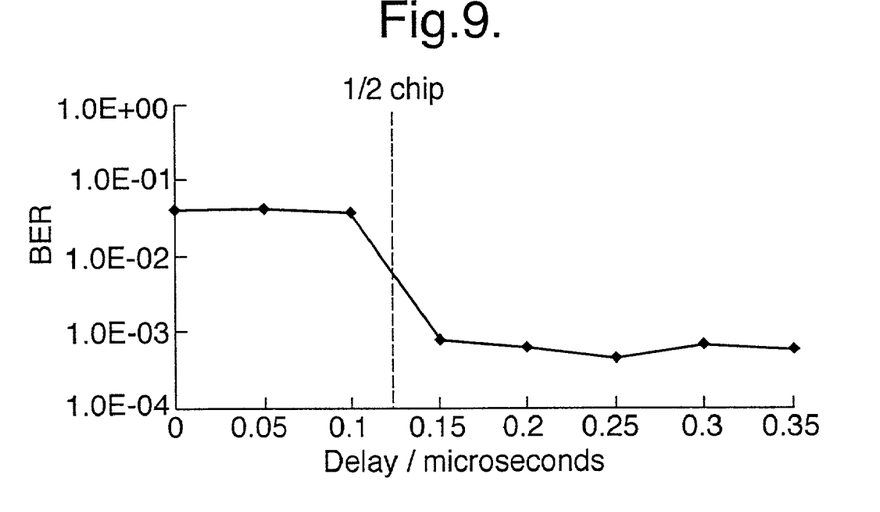
FIG. 9 shows how BER varies with the time delay between a line of sight signal and an equal magnitude signal of random phase, representing the same signal received via a different path.

FIG. 9 shows how BER varies with the time delay between a line of sight signal and an equal magnitude signal of random phase, representing the same signal received via a different path. In this example the chipping rate is 4 Mchip/s with a period of 0.25 s and the Eb/No is 6.8 dB resulting in a BER of $1 \times 10^{-3}$ when no multipath interference occurs. In this example the sampling point is midway through the chip resulting in the start of the next chip occurring after a delay 0.125 s. It can be seen that the low BER is maintained until the two signals are spaced by less than the chipping period then significant fading (destructive interference) results and the BER increases significantly.

Figure 10:
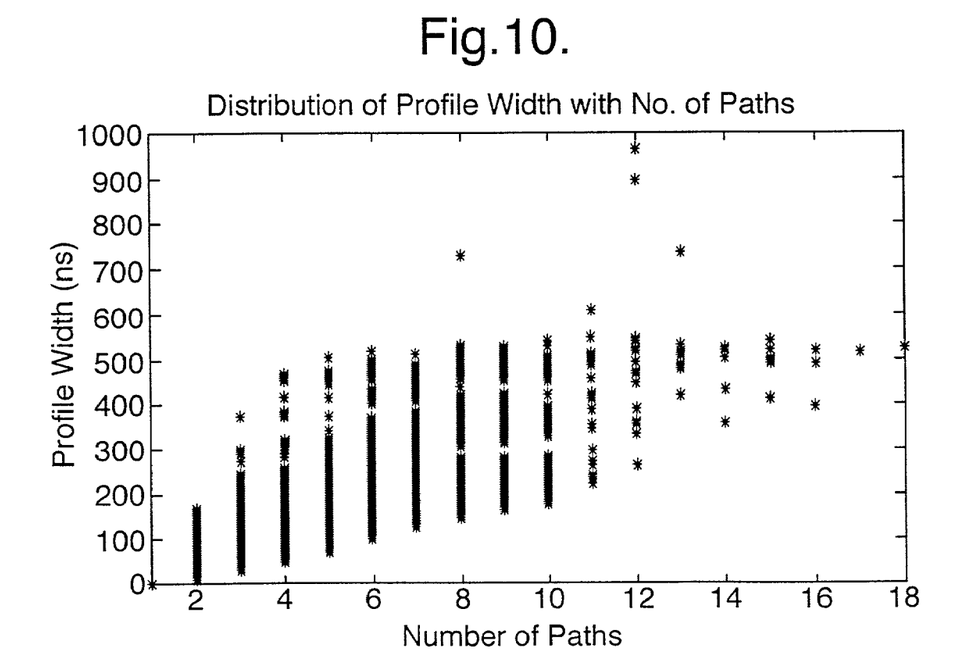
FIG. 10 shows results taken from channel sounding measurements in a typical microcellular environment demonstrating the small inter-arrival delays between multipaths in a dense urban environment.

FIG. 10 shows results taken from channel sounding measurements in a typical microcellular environment. A significant multipath is defined as paths which have a signal strength within 10 dB of the strongest signal. In the graph of FIG. 10 the profile width is plotted against the number of significant multipaths. It can be seen that, in many cases, all of the energy is distributed within a 0.5 s window, even when many paths are contributing. If the chipping period is 0.25 s many separate multipaths will arrive within each chip interval resulting in fading and thus degradation of system performance. Therefore, for much of the time the system is only able to resolve 2 multipaths. Increasing the chip rate not only reduces fading but also yields more resolvable multipaths which could beneficially be combined at the receiver.

Figure 11:
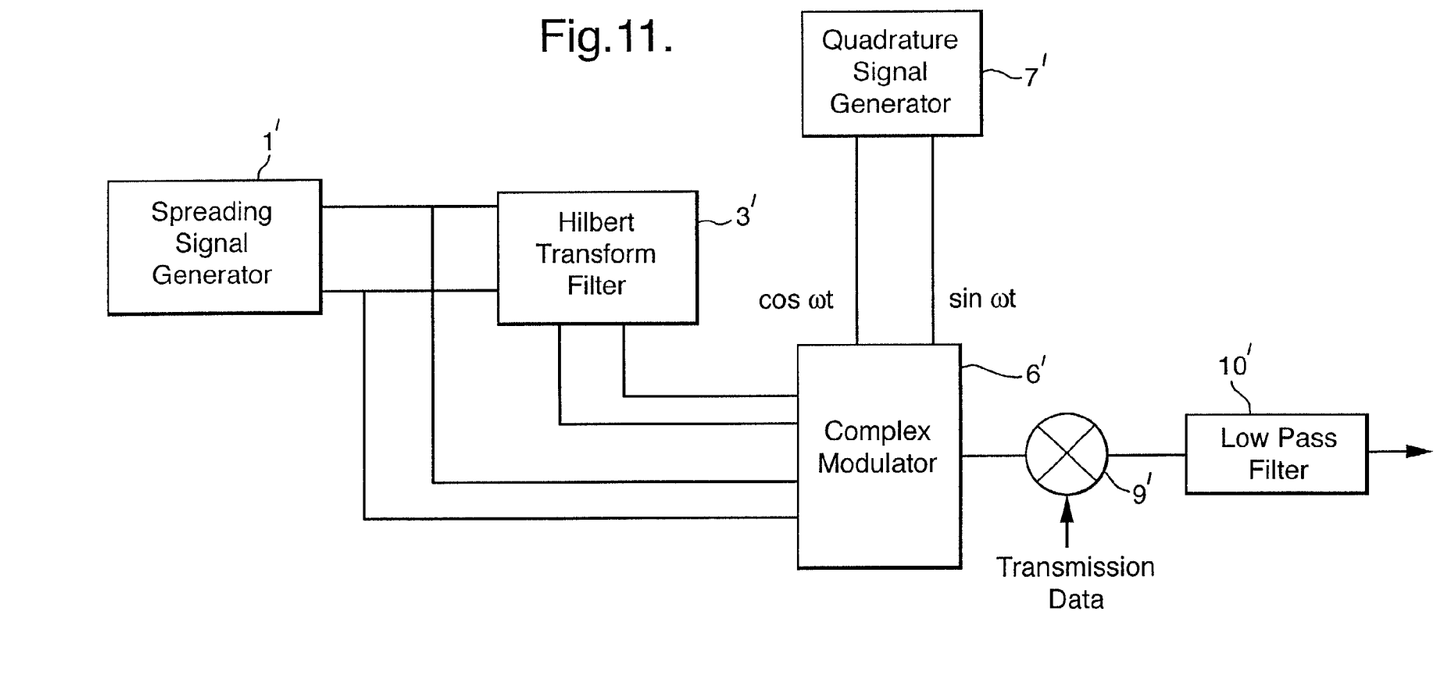
FIG. 11 shows a decoder for decoding a signal transmitted according to the invention.

FIG. 11 shows a decoder for decoding the transmitted signal of this invention. A despreading signal is generated using a spreading signal generator 1', a Hilbert transform filter 3', a quadrature signal generator 7' and a complex modulator 6' in a similar manner to the generation of the spreading signal shown in FIG. 3e. The transmitted data is demodulated, and despread by a modulator 9, and then low pass filtered by a low pass filter 10 to achieve the decoded signal.

What is claimed is:

1. A method of generating a single sideband spread spectrum signal, said method comprising:

i) generating a complex spreading signal, in which the complex spreading signal is derived from a sequence defined by the equation $$\alpha_m = W_N^{m^2/2 + qm} \quad N \text{ even}$$
$$= W_N^{m(m+1)/2 + qm} \quad N \text{ odd}$$

where $$W_N = e^{-i2\pi r/N}$$

m=0, 1, 2, ..., N−1, q is any integer and the number of sequences of a given length is N and r is an integer relatively prime to N, ii) phase-shifting the complex spreading signal in accordance with a Hilbert transform to produce a phase-shifted complex spreading signal;

iii) upconverting the complex spreading signal and the phase-shifted complex spreading signal to a higher frequency to produce the single sideband spread spectrum signal;

iv) bandlimiting at least one of the complex spreading signal or the single sideband spread spectrum signal; and v) modulating one of the complex spreading signal or the single sideband spread spectrum signal with an input data signal, wherein the order in which steps iv) and v) are performed is immaterial.

2. A method according to claim 1 in which the bandlimiting step is performed after the upconversion step.

3. A method according to claim 1 in which the modulation step is performed after the upconversion step.

4. A method of decoding a single sideband spread spectrum signal, said method comprising:

upconverting a complex spreading signal to a higher frequency, in which the complex spreading signal is derived from a sequence defined by the equation $$\alpha_m = W_N^{m^2/2 + qm} \quad N \text{ even}$$
$$= W_N^{m(m+1)/2 + qm} \quad N \text{ odd}$$

where $$W_N = e^{-i2\pi r/N}$$

m=0, 1, 2, ..., N−1, q is any integer and the number of sequences of a given length being N and r is an integer relatively prime to N, and demodulating a received signal in accordance with the upconverted complex spreading signal.

* * * * *